United States Patent
Bekiroglu

(10) Patent No.: US 6,810,654 B2
(45) Date of Patent: Nov. 2, 2004

(54) CHAIN ASSEMBLY METHOD FOR JOINING A FLAT LINK ARTICULATED CHAIN

(75) Inventor: Murat Bekiroglu, Karlsfeld (DE)

(73) Assignee: Joh. Winklhofer & Sohne GmbH und Co. KG, Munich (DE)

( * ) Notice: Subject to any disclaimer, the term of this patent is extended or adjusted under 35 U.S.C. 154(b) by 102 days.

(21) Appl. No.: 10/070,741

(22) PCT Filed: Feb. 15, 2001

(86) PCT No.: PCT/EP01/01704

§ 371 (c)(1),
(2), (4) Date: Jul. 19, 2002

(87) PCT Pub. No.: WO02/04142

PCT Pub. Date: Jan. 17, 2002

(65) Prior Publication Data

US 2003/0056489 A1 Mar. 27, 2003

(30) Foreign Application Priority Data

Jul. 12, 2000 (DE) .......................... 100 33 726

(51) Int. Cl.$^7$ ................................................ B21L 9/06
(52) U.S. Cl. .................................. 59/35.1; 59/7; 59/11
(58) Field of Search ............................ 59/4, 5, 7, 35.1, 59/11

(56) References Cited

U.S. PATENT DOCUMENTS

| | | | | | |
|---|---|---|---|---|---|
| 2,831,316 | A | * | 4/1958 | Linde, Jr. ..................... | 59/7 |
| 3,802,184 | A | * | 4/1974 | Brown et al. ................. | 59/4 |
| 3,943,702 | A | * | 3/1976 | Lacombe-Allard ........... | 59/4 |
| 4,027,471 | A | | 6/1977 | Lipp et al. | |
| 6,490,853 | B1 | * | 12/2002 | Winklhofer et al. ......... | 59/7 |

FOREIGN PATENT DOCUMENTS

| | | |
|---|---|---|
| DE | 452 502 | 11/1927 |
| DE | 2 210 983 | 9/1972 |
| DE | 198 36 374 | 2/2000 |
| GB | 384781 | 12/1932 |

* cited by examiner

Primary Examiner—David B Jones
(74) Attorney, Agent, or Firm—Finnegan, Henderson, Farabow, Garrett & Dunner, L.L.P.

(57) ABSTRACT

The invention relates to a chain assembly method for joining a single or multiple link-plate chain having alternating, uncranked outer and inner chain links using prefabricated inner chain links in particular comprising two parallel link plates and parallel hollow pins connecting the latter. This assembly method is to be simplified as compared with production methods used hitherto for link plate chains.

12 Claims, 2 Drawing Sheets

⑤ RIVET

④ RIVET

①

②

③

④

⑤ RIVET

CHAIN ASSEMBLY METHOD FOR JOINING A FLAT LINK ARTICULATED CHAIN

BACKGROUND OF THE INVENTION

The present invention relates to a chain assembly method for joining a link-plate chain having alternating outer and inner chain links using prefabricated inner chain links comprising two parallel link plates and parallel hollow pins connecting the latter.

Single or multiple chains, in particular for drive and conveying purposes, are normally produced in the manner of a layer construction method. In the case of a single chain, for example, in one method variant first of all a lower outer link plate is put in place, then an inner chain link is arranged on this, a link pin is subsequently inserted through the aligned holes in these two parts and then the upper outer link is preassembled, after that the upper outer link plate is assembled to dimension and finally the end regions of the link pin are riveted. Each of the steps mentioned above is carried out during one clock cycle during assembly. Accordingly, six clock cycles are needed to assemble a single chain. In this case, work is carried out against a fixed stop and the latter is formed by a guide surface on which the underside of the lower outer link plate rests. The axes of the link pins and associated holes in the components are arranged in such a way that secure contact with the lower outer link plate is provided by the force of gravity.

DE 19836374 also discloses an assembly method in which, by means of the symmetrical execution of a tongs-like movement, joining is not carried out against a fixed stop but symmetrically in relation to a principal chain center line. Described in detail there is only the joining of the inner chain link, without discussing in more detail the joining or assembly sequence of the chain overall. Also shown in this document is a feed system in the form of a rotary table, which feeds the horizontally guided link plates and the vertically guided hollow pins toward each other.

Furthermore, in the case of track chains with cranked chain links, for example, it is known to join these together in the horizontal direction. In such track chains, such as are produced in accordance with U.S. Pat. No. 4,027,471 in an assembly system, all the chain links are of the same construction, so that no distinction can be drawn between inner and outer chain links. The joining operation is carried out in such a way that both the hollow pin and the link pin are inserted at the same time. Here, too, during the actual joining operation, work is carried out against a fixed stop for one of the cranked link plates. The horizontal arrangement of the link pin axes is probably preferred in the case of cranked chains, since their cranked-over link plates do not provide any flat supporting surface.

It is now the object of the present invention to provide a simplified chain assembly method for the assembly of single and multiple chains having inner and outer chain links.

SUMMARY OF THE INVENTION

According to the invention, this object is achieved by a method having the following steps:

providing at least one completely prefabricated inner chain link,
positioning the inner chain link so that the hollow pin axis of the at least one inner chain link is aligned substantially parallel to the supporting or retaining face of the inner chain link,
providing at least one link pin,
positioning the at least one link pin so that the pin axis is arranged coaxially with the hollow pin axis of the associated hollow pin of an inner chain link,
inserting the link pin into the hollow pin by means of relative displacement of the link pin and of the at least one inner chain link in relation to each other so that the end regions of the link pin project on both sides,
providing at least one pair of outer link plates having receiving holes for the link pins,
positioning the at least one pair of outer link plates so that each end region of a link pin is assigned one of the outer link plates of a pair of outer link plates and the axis of the receiving hole is aligned with the axis of the associated link pin,
pressing the two outer link plates of a pair of outer link plates in one operation onto the end regions of two link pins to produce an outer chain link connected to at least two inner chain links arranged in a row,
riveting the ends of the link pins.

BRIEF DESCRIPTION OF THE DRAWINGS

In the following, method variants will be explained in more detail using drawings, in which.

DETAILED DESCRIPTION OF THE INVENTION

Figure 1:
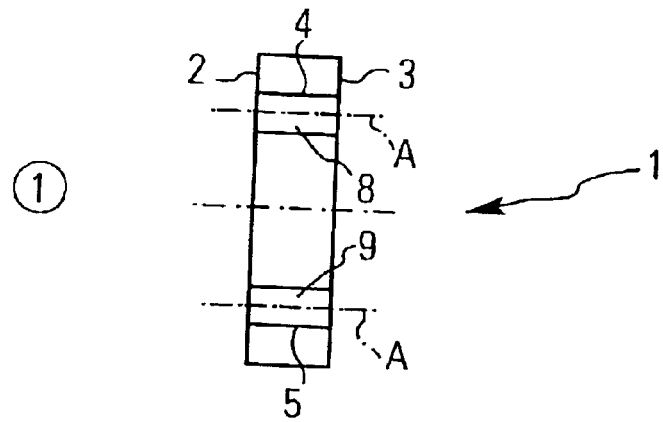
FIG. 1 shows a schematic flow diagram relating to joining a single chain in four cycle steps and FIG. 2 shows a basic sketch of a flow diagram for producing a duplex chain in five cycle steps.
Figure 1:
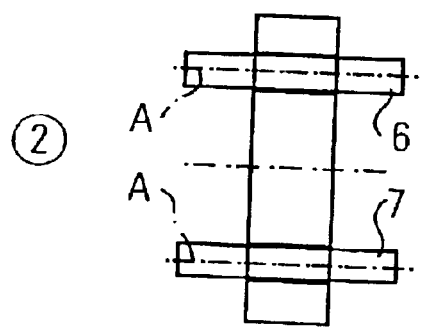
Figure 1:
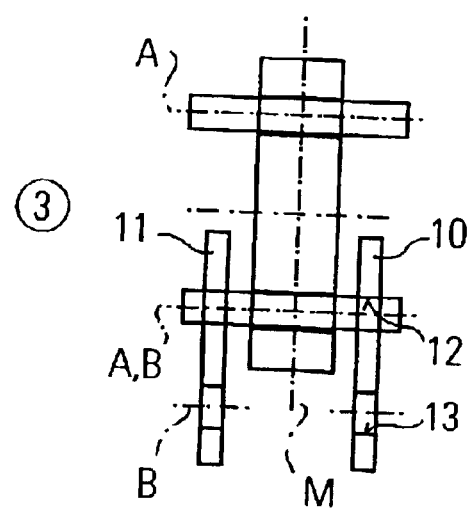

In contrast to the most familiar methods in the prior art, according to the assembly method of the invention, the chain is not built up from bottom to top by being placed on the lower outer link plates. Instead, here a different assembly direction is selected, which has previously been known only in the case of cranked track chains. The hollow pin axes accordingly run substantially parallel to the supporting or retaining face of the inner chain link. This means that the inner chain link is on top with the lower narrow sides (or a region thereof) of the inner link plates or a region of the outer circumference of the hollow pins. In addition, the lower narrow sides of the outer link plates may be on top. Also intended to be comprised is an assembly variant in which rollers are also arranged on the hollow pins (in order to produce a roller chain) and, under certain circumstances, can also be used on top. The hollow pin axes are principally aligned horizontally. In addition, the lower narrow sides and a plane running through the two horizontal pin axes are beneficially arranged horizontally. By this means, the inner chain link is accessible from two sides, for which reason the outer link plates can also be supplied simultaneously from both sides. The layer construction hitherto permitted no other assembly sequence, since otherwise the link pin had to be pushed completely through a link plate.

Although there is also a method which does not work against a fixed stop, a vertical arrangement of the hollow pin axis was hitherto always selected in this method, for guidance reasons. The fact that hitherto no deviation has been made from the horizontal arrangement of the link plates in the case of non-cranked chains probably has something to do with the greater contact surface for guiding at least the link plates. Because of the fact that these link plates no longer have these advantages in the case of cranked chains the on-edge arrangement was the obvious thing in these cases.

However, hitherto this did not cause those skilled in the art to also perform an on-edge arrangement when assembling "normal" link-plate chains with inner and outer chain links. In addition, it should also be noted that U.S. Pat. No. 4,027,471 merely shows an assembly operation and an apparatus which performs complete joining in a single operation.

Although assembly is generally carried out chain link by chain link, it is quite possible for provision to be made for the individual steps to be carried out in parallel on a plurality of chain links at the same time.

The construction of U.S. Pat. No. 4,027,471 for the production of the chains is not suitable either for the mass production of conventional drive or conveyor chains. Using this construction, only the much slower production of large track chains is possible. The masses to be moved in this machine would in all probability not permit the high speeds which are present during normal chain production.

In order that, at least in one direction, no additional precautions against slipping of the inner chain link have to be made, the arrangement of the inner chain link on the supporting or retaining face can be carried out in such a way that the hollow pin axes are arranged substantially at right angles to the action of the force of gravity. This means that both link plates can be used for support. The action of supplying the outer link plates for the outer chain link can be carried out freely accessibly from both sides, since neither of the outer link plates has to serve as a horizontal support.

As a rule, it will be simpler if, according to one variant, first of all the inner chain link is positioned and then the associated link pins are supplied to be positioned. The inner chain link on top in no way hinders the subsequent relative insertion of the link pin into the inner chain link. In the case of specific machine variants, however, it could also be advantageous if the link pins are positioned first and then the associated inner chain link is supplied to be positioned. Because of the fact that the link pin axes are likewise aligned in parallel with the supporting or retaining face of the inner chain link, these have to be held clamped in on one side.

Furthermore, the outer link plates of a pair of outer link plates can be prepositioned from both sides relative to the associated inner chain links. This method step should be carried out as uniformly as possible, in order that the entire operation can be integrated into one working cycle. The supplying action has to be concluded at the least only before the two outer link plates are pressed on, so that here the cycle of the entire operation may be set very effectively. As a result of pressing the outer link plates on simultaneously, these two pressing operations toward each other at the ends of the link pins have only a very slight influence. In the case of chain assembly methods mostly used hitherto, one press connection is always ready before the other is produced. Here, it is necessary to ensure that as little influence as possible is exerted by further pressing operations on the press connection finished first.

One method variant beneficially provides for the method steps to be combined into four cycle groups, the steps of one cycle group being carried out at the same time by machines. Normally, one cycle group always means a to and fro movement of a press tool for assembling the components. The cycle groups are divided up as follows:

the first cycle group comprises the steps of providing at least one completely prefabricated inner chain link, positioning the inner chain link so that the hollow pin axis of the at least one inner chain link is aligned substantially parallel to the supporting or retaining face of the inner chain link, the second cycle group comprises the steps of providing at least one link pin, positioning the at least one link pin so that the pin axis is arranged coaxially with the hollow pin axis of the associated hollow pin of an inner chain link, inserting the link pin into the hollow pin by means of relative displacement of the link pin and of the at least one inner chain link in relation to one another so that the end regions of the link pin project on both sides, the third cycle group comprises the steps of providing at least one pair of outer link plates having a receiving hole for the link pins, positioning the at least one pair of outer link plates so that each end region of a link pin is assigned one of the outer link plates of a pair of outer link plates and the axis of the receiving hole is aligned with the axis of the associated link pin, pressing the two outer link plates of a pair of outer link plates in one operation onto the end regions of two link pins to produce an outer chain link having at least two inner chain links arranged in a row, the fourth cycle group comprises the step of riveting the ends of the link pins.

The chain to be produced is moved forward cycle by cycle or step by step and these four cycle groups are carried out one after another. This means that after four cycle groups, at least one inner chain link is always connected to an outer chain link. Purely theoretically, it would also be conceivable to combine the two first cycle groups if the supply problem has to be solved quickly.

On account of the fact that the method can be used not only for the assembly of single chains, in a method variant for producing a multiple chain, in particular a duplex chain, additional steps are also provided:

arranging at least two completely prefabricated inner chain links lying beside each other so that the hollow pin axes of the inner chain links lying beside each other are arranged coaxially with each other, between inner chain links lying beside each other, intermediately joining at least one center link plate having receiving holes for the link pins, so that the axes of the holes are arranged coaxially with the hollow pin axes. The center link plates can be both subsequently pressed onto the link pin and also seated loosely on the latter. Depending on the number of tracks of the multiple chain running beside one another, a corresponding number of inner chain links is arranged beside one another. The inner chain links are then separated from one another in each case by a center link plate or two center link plates. Like the outer link plates, in each case a center link plate joins two inner chain links together with the respectively associated link pins.

In this method variant for multiple chains, provision can likewise be made for the link pins to be positioned first and then for the associated inner chain links with link plates to be supplied to be positioned.

In addition, in the production of multiple chains, the method steps are preferably combined into cycle groups. Here, there are beneficially five cycle groups, the steps of one cycle group being carried out simultaneously by machines. The cycle groups are grouped as follows:

the first cycle group comprises the steps of providing at least one completely prefabricated inner chain link, positioning the inner chain link so that the hollow pin axis of the at least one inner chain link is aligned substantially parallel to the supporting face or retaining face of the inner chain link, arranging at least two completely prefabricated inner chain links lying beside each other so that the hollow pin axes of the inner chain links lying beside each other are aligned coaxially with one another, the second cycle group comprises the steps of joining at least one center link plate having a receiving hole for the link pins between inner chain links lying beside each other, so that the hole axes are arranged coaxially with the hollow pin axes, the third cycle group comprises the steps of providing at least one link pin, positioning the at least one link pin so that the pin axis is arranged coaxially with the hollow pin axis of the associated hollow pin and the receiving hole of the center link plate, inserting the link pin into the hollow pin and the receiving hole of the center link plate by means of relative displacement of the link pin, of the at least one inner chain link and of the center link plate in relation to one another, so that the end regions of the link pin project on both sides, the fourth cycle group comprises the steps of providing at least one pair of outer link plates having a receiving hole for the link pins, positioning the at least one pair of outer link plates so that each end region of a link pin is assigned one of the outer link plates of a pair of outer link plates and the axis of the receiving hole is aligned with the axis of the associated link pin, pressing the two outer link plates of a pair of outer link plates in one operation onto the end regions of two link pins to produce an outer chain link connected to at least two inner chain links arranged in a row, the fifth cycle group comprises the step of riveting the ends of the link pins.

Hitherto, in order to construct a duplex chain, eight cycle steps were needed if this were constructed with the layer construction, beginning with the lower outer link plate. This number increased accordingly the more tracks the multiple chain had.

Furthermore, the first and the second cycle group in the production of multiple chains can also be carried out in the opposite sequence. If, in the case of a duplex chain, one begins with the center link plate, then the construction is again carried out symmetrically from the inside to the outside, starting from the center line. Here, too, there is the possibility of firstly pushing the pin into the receiving hole relative to the center link plate and then of placing the inner chain links from both sides.

In the following text, method variants will be explained in more detail using drawings, in which:

Illustrated in simplified form in FIG. 1 is an inner chain link 1 which, although it can be produced from one block, preferably comprises two parallel inner link plates 2 and 3 and hollow pins 4 and 5 connecting these to each other. The hollow pins 4 and 5 are pressed into holes in the inner link plates 2 and 3 and hold the inner link plates 2 and 3 at a distance. The hollow pin axes A are aligned horizontally in the first cycle group of the assembly method, which means that they are arranged substantially at right angles to the action of the force of gravity. However, this also means that FIG. 1 can be viewed as a plan view.

The material used is generally steel with appropriate strength values. Running rollers can also be arranged on the hollow pins 4 and 5 in order to produce a roller chain.

Because of the alignment of the inner chain link 1, the latter rests on the lower narrow sides of its inner link plates 2 and 3 or on the circumferential surfaces of the hollow pins 4 and 5.

Following the cycle group one, two link pins 6 and 7 are positioned so that the link pin axes are aligned coaxially with the hollow pin axes A. The link pins 6 and 7 are then pushed into the cylindrical openings 8 and 9 of the sleeve-like hollow pins 4 and 5. Whether the active movement is carried out by the link pins 6 and 7 or by the inner chain links 1 plays a minor part in the method sequence. The important factor is that a relative movement is carried out between these components.

In the third cycle group, the outer link plates 10 and 11 are supplied as a pair. The alignment of the outer link plates 10 and 11 is carried out parallel to the alignment of the inner link plates 2 and 3 but offset along the chain center axis M, so that the outer link plates 10 and 11 are in each case connected to two chain links 1. The outer link plates 10 and 11 each have two cylindrical receiving holes 12 and 13 arranged at a distance from each other, whose hole axis B is aligned coaxially with the link pin axis and hollow pin axis A. Pressing is then carried out by means of simultaneously pushing the outer link plates 10 and 11 onto the end regions of the link pins 6 and 7. In the process, the outer link plates 10 and 11 are in each case pushed onto two link pins 6 and 7 of adjacent inner chain links 1. This pushing-on action is carried out directly to size. For this purpose, a tongs-like movement is carried out symmetrically in relation to the center axis M, while the link pins 6 and 7 are centered symmetrically in relation to the chain center axis M or are fixed before the outer link plates 10 and 11 are pressed on. In order to carry out such a procedure a device as described in DE 19836374, for example, is suitable. This permits the centered fixing of two link pins 6 and 7 at the same time and the subsequently centered action of pushing the outer link plates 10 and 11 on from both sides at the same time.

This means that both outer link plates 10 and 11 carry out a relative movement in relation to the stationary link pins 6 and 7 and to the stationary main chain axis M.

The pushing-on action is carried out in one operation to size, so that unnecessary loadings of the press fit are avoided.

In the fourth cycle group, the projecting end regions of the link pins 6 and 7 are riveted by means of a riveting operation.

Each of the cycle groups is carried out at one station of a chain assembly device before the chain to be assembled is moved onward by one cycle step.

Figure 2:
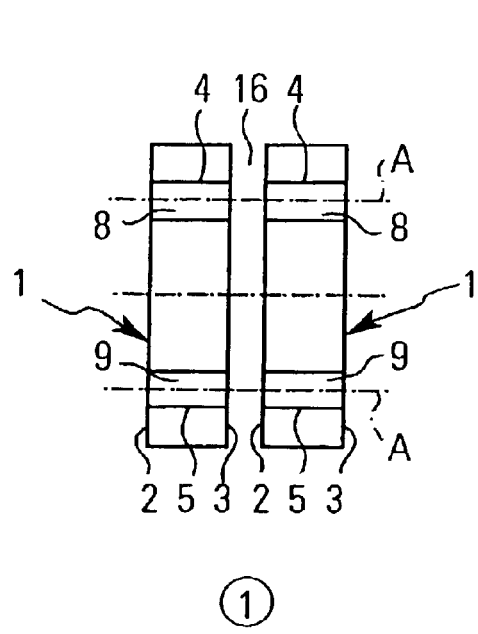
Figure 2:
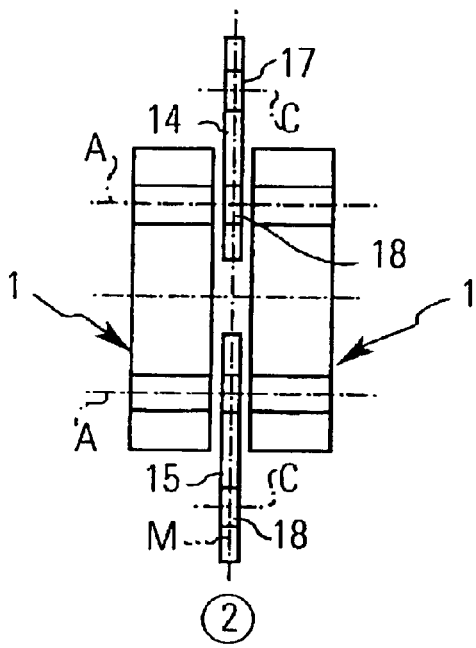
Figure 2:
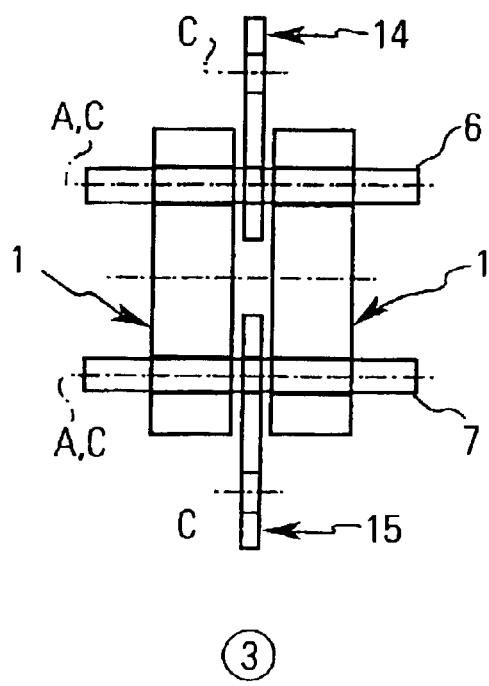
Figure 2:
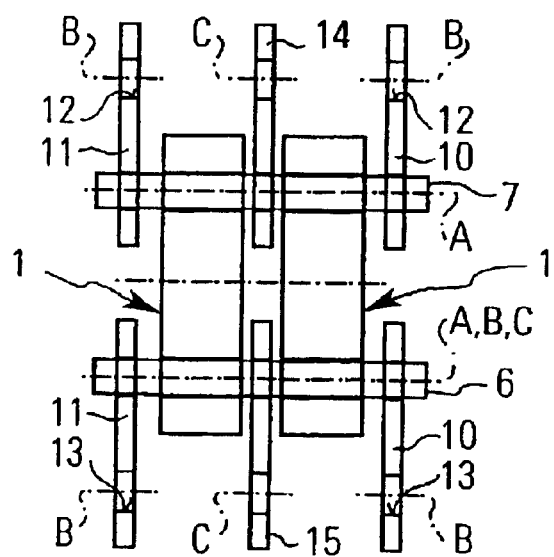

In the following text, a method variant for the assembly of a multiple chain will be described using FIG. 2. In the practical case, this is a duplex chain. If reference is made to elements which are identical and have the same effect, the same reference symbols will be used and, to this end, reference will be made to the preceding description while avoiding repetition.

In the first cycle group of this assembly method, two inner chain links 1 arranged parallel to each other are prepositioned in such a way that their hollow pin axes A are aligned with each other and they are arranged at a small distance from each other. Here, too, the inner chain links 1 can be constructed or modified as already described above. The arrangement is made in such a way that the hollow pin axes A are arranged horizontally, which means substantially at right angles to the action of the force of gravity.

In a second cycle group, two center link plates 14 and 15 are introduced into the gap 16 between the inner chain links 1. The center link plates have two cylindrical receiving holes 17 and 18 which are arranged at a distance from each other and whose hole axes are aligned coaxially or in alignment with the hollow pin axes A. The center link plates 14 and 15 are arranged along the main center axis M so as to be offset with respect to the inner chain links 1, so that in each case a center link plate 14 or 15 is assigned to two inner chain links 1. The center link plates 14 and 15 are also arranged parallel to the inner link plates 2 and 3 of the inner chain links 1.

In a third cycle group, the link pins 6 and 7 are firstly prepositioned such that they are in each case aligned coaxially with the associated hollow pin axes A before they are subsequently pushed into the openings 8 and 9 of the hollow pins 4 and 5 and into receiving holes 17 and 18 of the two center link plates 14 and 15, so that the end regions of the link pins 6 and 7 project laterally beyond the inner chain links 1.

In a fourth cycle group, the outer link plates 10 and 11 are supplied simultaneously from the side, so that the axes B of their receiving holes 12 and 13 are aligned coaxially with the associated axes A of the link pins 6 and 7 and the hollow pins 4 and 5. In this case, the outer link plates are arranged to be offset in exactly the same way as the center link plates 14 and 15 in the direction of the main chain center axis M. Immediately after being supplied, the outer link plates 10 and 11 are pressed onto the end regions of the link pins 6 and 7, symmetrically with respect to the main chain axis M. Here, too, the link pins 6 and 7 are previously centered or held fixed symmetrically with respect to the main chain axis M and then the outer link plates 10 and 11 are pushed onto the stationary link pins 6 and 7 at the same time.

In the fifth cycle group, the riveting of the end regions of the link pins 6 and 7 is finally carried out.

Accordingly, by means of five cycle groups, duplex chains and even multiple chains with a plurality of tracks can be produced. Here, too, each cycle group again means moving the chain forward by one cycle step, while the subsidiary steps are carried out within one cycle group.

In particular in the case of producing the multiple chain, the cycle groups can also be carried out in a different sequence. There is, for example, the possibility of supplying and arranging the center link plates 14 and 15 first, then pushing or pressing the link pin 6 and 7 into the center link plate 14 and 15 and then pushing the inner chain links 1 on from the outside. The cycle groups four and five then proceed in the accustomed sequence again. However, this different sequence does not increase the total number of cycle groups to be carried out. In the case of a layer construction, in the case of each additional track of a multiple chain, some assembly cycle groups will again be added, since in each case after a center link plate has been joined, a layer of inner chain links again has to be put in place first.

As opposed to the production of a cranked track chain, during each operation uniform symmetrical forces are always applied during the pressing-on action since in each case the same diameters and press-fit relationships are concerned. In the case of a track chain, on the other hand, in each case a solid pin and a hollow pin has to be pressed simultaneously, with completely different force relationships.

The invention therefore leads to a considerable reduction in the cycle groups in a cycled production method for producing "simple" link plate chains comprising inner chain links and outer chain links.

What is claimed is:

1. A chain assembly method for joining a linkplate chain having alternating outer and inner chain links, said assembly method comprising the following steps:
    providing two completely prefabricated inner chain links,
    positioning the two inner chain links in a row and so that a hollow pin axis of each of the two inner chain links is aligned substantially parallel to a hollow pin axis of the other and to a supporting or retaining face of the inner chain link (1) links,
    providing two link pins,
    positioning the two link pins so that an axis of each link pin is arranged coaxially with a hollow pin axis of one of the two inner chain links,
    inserting the link pins into the hollow pin axes by relative displacement of the link pins and of the two inner chain links in relation to each other so that end regions of link pins project from both sides of the two inner chain links,
    providing at least one pair of outer link plates having receiving holes for the link pins, positioning the outer link plates so that each end region of the link pins is assigned one of the receiving holes of the outer link plates of the pair of outer link plates and an axis of the receiving holes is aligned with the axis of the associated link pin,
    pressing the two outer link plates of the pair of outer link plates in one operation onto the end regions of the two link pins to produce an outer chain link connected to the two inner chain links arranged in a row, and
    riveting the ends of the link pins.

2. The method of claim 1, in which the arrangement of the inner chain links on the supporting or retaining face is carried out in such a way that the hollow pin axes are arranged substantially at right angles to the action of the force of gravity.

3. The method of claim 1 or 2, in which the inner chain links are positioned first and then the associated link pins are supplied to be positioned.

4. The method of claim 1 or 2, in which the link pins are positioned first and then the associated inner chain links are supplied to be positioned.

5. The method of claim 1 wherein the outer link plates of the pair of outer link plates are positioned simultaneously from both sides relative to the associated inner chain links.

6. The method of claim 1 wherein the action of pressing the two outer link plates of the pair of outer link plates in one operation is carried out symmetrically in relation to the link pins previously fixed symmetrically with respect to a chain center line.

7. The method of claim 1 wherein the method steps are combined into four cycle groups, the steps of one cycle group being carried out simultaneously by machines,
    the first cycle group having the steps:
        providing the two inner chain links positioning the inner chain links in a row so that a hollow pin axis of each inner chain link is aligned substantially parallel to the hollow pin axes of the other and to a supporting or retaining face of the inner chain links,
    the second cycle group having the steps:
        providing the two pins, positioning the two pins so that an axis of each pin is arranged coaxially with a hollow pin axis of an associated inner chain link, inserting the link pins into the hollow pin axes by relative displacement of the link pins and of the two inner chain links in relation to one another so that end regions of the link pins project from both sides of the inner chain links,
    the third cycle group having the steps:
        providing at least one pair of outer link plates having receiving holes for the link pins, positioning the at least one pair of outer link plates so that each end region of a link pin is assigned a receiving hole of an outer link plate of the pair of outer link plates and an axis of a receiving hole is aligned with the axis of the associated link pin, pressing the two outer link plates of the pair of outer link plates in one operation onto the end regions of the two link pins to produce an outer chain link connected to the two inner chain links arranged in a row, and the fourth cycle group having the step:

riveting the ends of the link pins.

8. The method of claim 1 for producing a multiple chain, which additionally comprises the following steps:

arranging two sets of inner chain links in a row, each set comprising at least two completely prefabricated inner chain links lying beside each other so that the hollow pin axes thereof are arranged coaxially with one another, joining at least one center link plate having receiving holes for the link pins between the two sets of inner chain links so that receiving hole axes of the center link plate are arranged coaxially with the hollow pin axes of the inner chain links.

9. The method of claim 8, wherein the link pins are positioned first and then the associated inner chain links and center link plate are supplied to be positioned.

10. The method of claim 8 wherein the method steps are combined into five cycle groups, the steps of one cycle group being carried out substantially simultaneously by machines, the first cycle group having the steps:

providing the two sets of inner chain links, positioning the two sets of inner chain links in a row so that the hollow pin axes of the links are aligned substantially parallel to each other and a supporting or retaining face of the inner chain links, the two inner chain links of each set lying beside each other so that the hollow pin axes thereof are arranged coaxially with one another, the second cycle group having the steps:

joining at least one center link plate having receiving holes for the link pins between the two sets of inner chain links so that receiving hole axes of the center link plate are arranged coaxially with the hollow pin axes of the inner chain links, the third cycle group having the steps:

providing the two link pins, positioning the two link pins so that an axis of each pin is arranged coaxially with a hollow pin axis of an associated of an inner chain link, inserting the link pins into the hollow pin axes and the receiving holes of the center link plate by relative displacement of the link pins and of the inner chain links and center link plate in relation to each other so that end regions of the link pins project from both sides of the two sets of inner chain links, the fourth cycle group having the steps:

providing at least one pair of outer link plates having receiving holes for the link pins, positioning the at least one pair of outer link plates so that each end region of a link pin is assigned a receiving hole of an outer link plate of the pair of outer link plates and an axis of a receiving hole is aligned with the axis of the associated link pin, pressing the two outer link plates of the pair of outer link plates in one operation onto the end regions of the two link pins to produce an outer chain link connected to at least two sets of inner chain links arranged in a row with the center link plate between them, and the fifth cycle group having the step:

riveting the ends of the link pins.

11. The method of claim 10, wherein the first and second cycle groups are carried out in a different sequence.

12. The method of claim 11, wherein the link pins are pushed into the center link plate before the first cycle group is carried out.

* * * * *

UNITED STATES PATENT AND TRADEMARK OFFICE
CERTIFICATE OF CORRECTION

PATENT NO. : 6,810,654 B2
DATED : November 2, 2004
INVENTOR(S) : Murat Bekiroglu It is certified that error appears in the above-identified patent and that said Letters Patent is hereby corrected as shown below:

Column 10,
Line 7, delete "of an" (second occurrence).

Signed and Sealed this

Twenty-second Day of February, 2005

JON W. DUDAS
*Director of the United States Patent and Trademark Office*